Dec. 9, 1969 W. CASE ET AL 3,482,666

BRAKE SETTING DEVICE

Filed Nov. 8, 1967 2 Sheets-Sheet 1

INVENTORS
Walter Case
William F. Benefield

BY Cecil L. Wood
ATTORNEY

BRAKE SETTING DEVICE

Filed Nov. 8, 1967 2 Sheets-Sheet 2

INVENTORS
Walter Case
William F. Benefield

BY Cecil L. Wood
ATTORNEY

United States Patent Office 3,482,666
Patented Dec. 9, 1969

3,482,666

BRAKE SETTING DEVICE

Walter Case, 10426 Desdemona Drive 75228, and William F. Benefield, 1337 Exeter 75216, both of Dallas, Tex.

Filed Nov. 8, 1967, Ser. No. 681,354
Int. Cl. B60l *7/08;* F16d *65/34*
U.S. Cl. 188—265 3 Claims

ABSTRACT OF THE DISCLOSURE

A brake setting mechanism for heavy vehicles adapted to be installed in existing braking systems without altering the normal operation thereof, and function to prevent involuntary movement of the vehicle, due to system failure, such as air or hydraulic fluid leakage, while standing, and includes a spring biased pawl rod engageable with rack teeth formed on the diaphragm actuated brake rod when operated thereagainst by a solenoid associated therewith and connected into the vehicle electrical system.

This invention relates to brake setting apparatus for heavy vehicles, such as trucks, road tractors, trailers, and the like, and it has particular reference to a semi-automatic mechanism by which the brakes on a standing vehicles can be positively set and so maintained independently of the air or hydraulic system.

OBJECTS AND PURPOSES

An object of the invention is that of providing a safe and dependable means by which the brakes of a heavy vehicle, when set by air or hydraulic pressure, can be readily and easily maintained against involuntary release and prevent accidental movement of the vehicle while parked or standing, and providing means for ready release by the vehicle operator.

Another object of the invention resides in the provision of a simple and economical device which can be readily installed by a mechanic of ordinary skill.

Yet another object of the invention is that of providing a mechanism which is self adjusting and capable of maintaining maximum efficiency of the brakes at all times by compensating for brake band wear and loss of actuating fluids while yet affording a manual control of the brakes in the event of failure of the fluid system.

DESCRIPTION OF THE DRAWINGS

While the foregoing objects are paramount, other and lesser objects will become apparent as the description proceeds when considered in connection with the appended drawings wherein.

DETAILED DESCRIPTION

Figure 1:
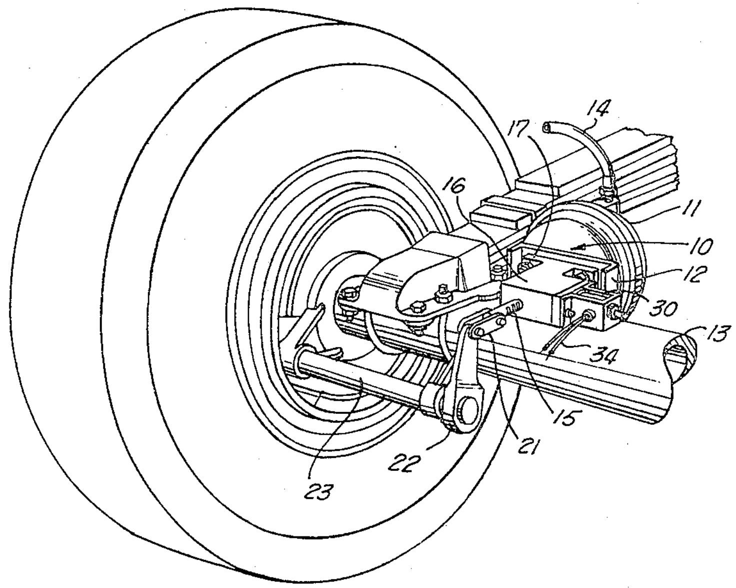
FIGURE 1 is a fragmentary perspective view of a typical rear axle assembly having an air actuated diaphragm attached thereto and showing the invention installed between the diaphragm and the brake actuating rod.

In FIGURE 1 is shown a perspective view of the invention in its preferred form and comprises a unit 10 which is connected into the conventional brake setting mechanism of a conventional type of road tractor, truck or trailer, which usually comprises an air actuated diaphragm 11, attached by a bracket 12 to the rear axle housing 13 and has an air conduit 14 connected thereto from the vehicle compressor (not shown).

Figure 2:
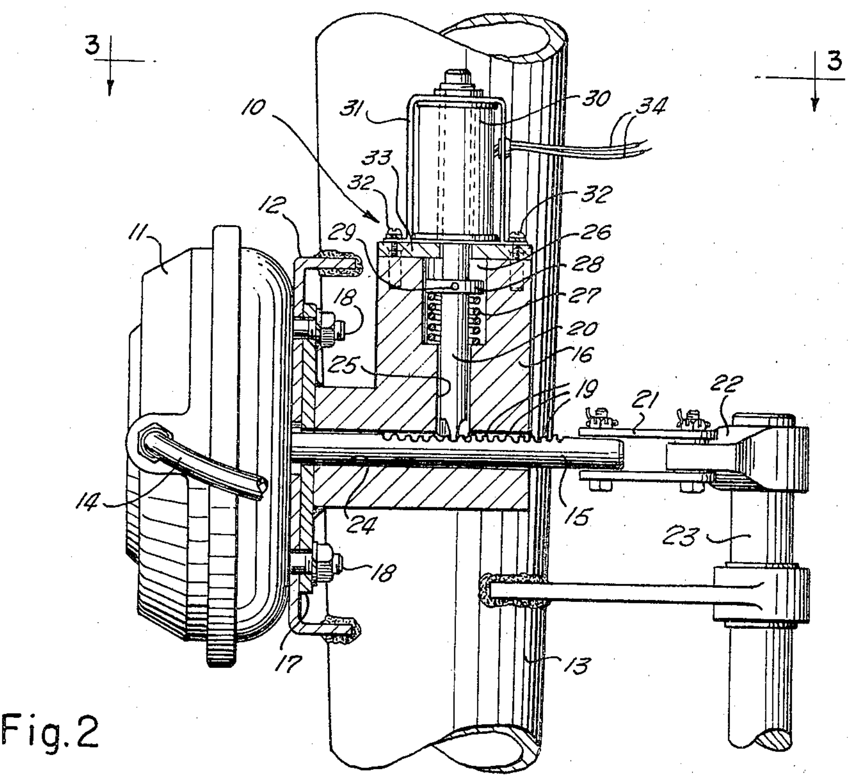
FIGURE 2 is a fragmentary plan view of a rear axle, an air actuated diaphragm and brake actuating rod, and showing, in transverse section, on line 2—2 of FIGURE 3, the casing in which the diaphragm connecting rod and pawl rod are housed, and showing the solenoid for operating the pawl rod.
Figure 3:
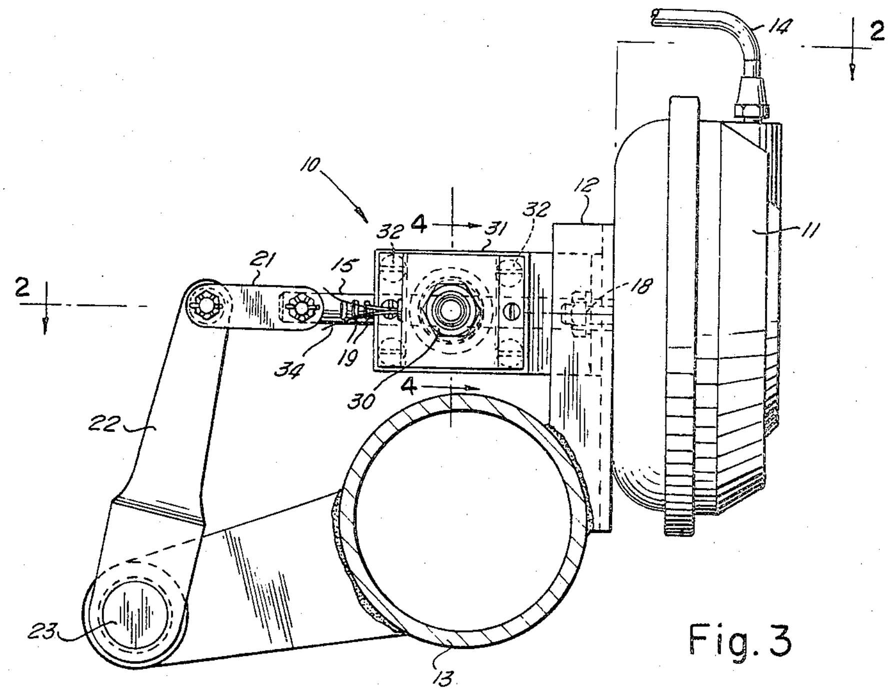
FIGURE 3 is a fragmentary transverse sectional view, on lines 3—3 of FIGURE 2, showing the rear axle, the brake actauting crank rod, the connecting rod linkage, and the diaphragm.

The brake actuator rod 15 is arranged through a casing 16, also attached to the rear axle housing 13 by a bracket 17 secured by bolts 18 to the bracket 12 on which the diaphragm 11 is mounted. The rod 15 has a series of rack teeth 19 formed transversely thereof, as best shown in FIGURE 2, between which the wedge-shaped end of a pawl rod 20 engages to restrain the rod 15 after the brake bands (not shown) are set by the conventional actuating system. The opposite end of the rod 15 is connected through a linkage 21 to a crank arm 22 on the outer end of a brake crank rod 23 which operates the brake bands.

Figure 4:
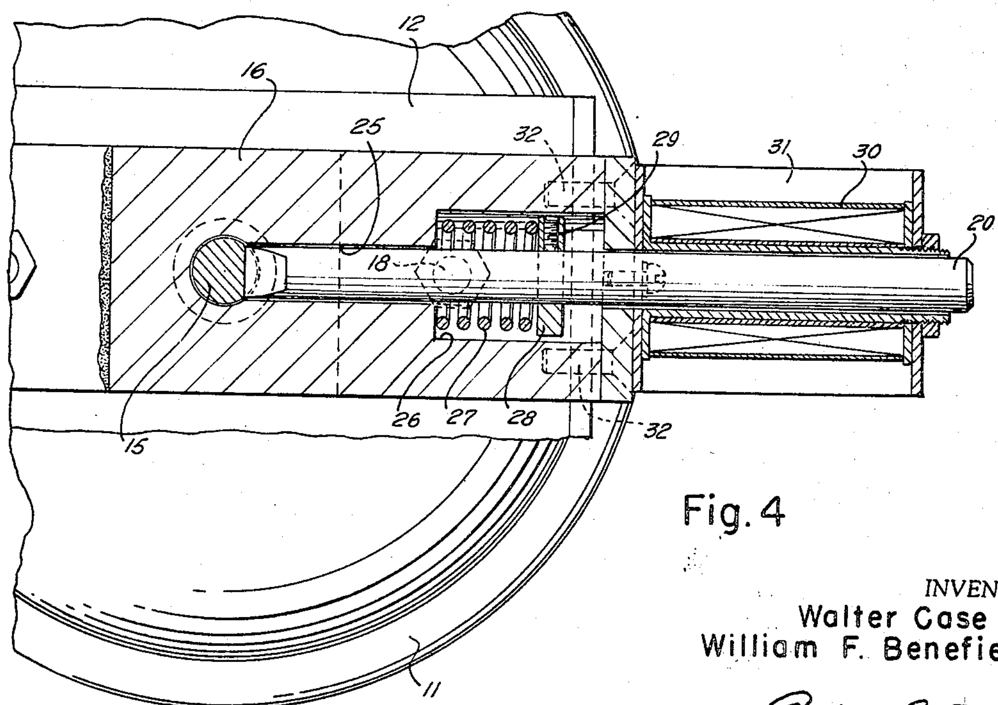
FIGURE 4 is a fragmentary sectional view, on line 4—4 of FIGURE 3, showing the pawl rod engaging the brake actuating rod, the spring and adjustable stop elements on the pawl rod, and the solenoid.

The rod 15 is arranged through a bore 24 traversing the casing 16, as shown in FIGURE 2, and has a bore 25 perpendicular thereto in which the pawl rod 20 operates. The bore 25 has an enlarged chamber 26 in its outer end to accommodate a compression spring 27 which embraces the rod 15 and whose tension is adjusted by a collar 28 on the latter which is secured in adjusted positions by a set-screw 29, as shown in FIGURES 2 and 4. A solenoid coil 30 is mounted on the casing 16 by a bracket 31 and is attached by screws 32, or other suitable means, through a plate 33 on one end of the casing 16, the said plate also providing a closure for the chamber 26. The pawl rod 20 extends through the solenoid coil 30 and is acted upon by the coil as a plunger.

The solenoid is connected by conductors 34 into the electrical system of the vehicle (not shown) and energized through a switch on the vehicle instrument panel.

The invention is designed primarily for installation on vehicles having a pneumatic braking system but it may obxiously be employed in hydraulic systems if desired. It is to be understood that the term "fluid," as used herein, includes both pneumatic and hydraulic pressure elements.

OPERATION

In operation, the invention is actuated after the brakes of the vehicle are set by the normal procedure of using the conventional system with which the vehicle is equipped. The apparatus of the invention is designed to fix and maintain the brake bands in positive engagement with the brake drums until released by the simple expedient of opening a switch on the instrument panel to de-energize the solenoid coil 30 whereby the pawl rod 20 can be retracted by the compression spring 27 to release the brake actuating rod 15 so that the brakes can be operated in the normal manner. The pawl rod 20 may be equipped with a suitable device through which it may be manually released from the rack teeth 19 on the brake actuating rod 15, in the event of failure of the solenoid through some defect in the vehicle electrical system.

Obviously, the invention may be modified as to certain features of construction and operation without departing from the spirit and intent thereof.

What is claimed is:

1. In a brake setting device for heavy vehicles, having pneumatic or hydraulic brake systems, a brake actuating rod, a power element for operating said actuating rod, and a brake crank rod operatively connected to said actuating rod and fixed to the rear axle housing of said vehicle, the said device comprising: a casing having a first bore transversely therethrough and a second bore perpendicular to and communicating with said first bore, the said brake actuating rod having a series of rack teeth transversely thereof and operatively extending through said first bore and connected at one end to said power element and connected at its opposite end through a linkage to said brake crank rod, a spring biased pawl rod in said second bore and a solenoid coil connected into the electrical system of said vehicle and embracing said pawl rod whereby, when said solenoid coil is energized, the pawl rod is operated to engage the rack teeth on said brake actuating rod and restrain the same in position to set the brakes.

2. In a brake setting mechanism, as described in claim 1, the said spring normally biasing the pawl rod in retracted position to release said brake actuating rod, the said pawl rod being extended to engage said brake actuating rod by said solenoid against the tension of said spring.

3. In a device as described in claim 1, and a collar on said pawl rod for adjusting the tension of said compression spring.

References Cited

UNITED STATES PATENTS

| | | | |
|---|---|---|---|
| 1,176,625 | 3/1916 | Tyson | 188—163 |
| 1,295,020 | 2/1919 | Fallek | 188—265 X |
| 2,099,453 | 11/1937 | Searle. | |
| 3,018,852 | 1/1962 | Stanton | 188—216 X |
| 3,312,314 | 4/1967 | Peters | 188—265 |

GEORGE E. A. HALVOSA, Primary Examiner

U.S. Cl. X.R.

74—503; 192—3; 188—163